June 21, 1927.

F. H. WILLIAMSON

AUTOMOBILE BUMPER

Filed March 16, 1925

1,633,055

Fred H. Williamson
INVENTOR.

BY Erwin, Wheeler & Woolard
ATTORNEYS.

Patented June 21, 1927.

1,633,055

UNITED STATES PATENT OFFICE.

FRED H. WILLIAMSON, OF CHICAGO, ILLINOIS, ASSIGNOR TO OSCAR E. STOKES, OF STREATOR, ILLINOIS.

AUTOMOBILE BUMPER.

Application filed March 16, 1925. Serial No. 15,880.

This invention relates to improvements in automobile bumpers.

Bumpers are subject to substantially continuous vibration when in use, and are also subject to occasional heavy shocks. It is the problem in this art to provide bumper mountings and bumpers which will withstand the continuous vibration and shocks without having their several parts become disassociated. It is one of the primary objects of this invention to provide a novel and improved bumper involving a plurality of parts in a peculiarly substantial relationship. It is a further object of this invention to provide a sturdy bumper having a minimum number of parts for accomplishing the desired results. By utilizing a comparatively small number of parts to accomplish our purposes, I contribute to the inherent strength and rigidity of the bumper as well as to its ability to withstand vibration without disintegration.

It is a further very important object of this invention to provide a bumper structure including a number of transversely extending bars, the ends of each of such bars being folded back and interconnected in a manner adapted to combine strength with resiliency. I provide a special retaining clip or fitting for keeping the ends of the several bars concealed and in their proper relative position. This clip or fitting is so designed as to support the parts from each other with a comparatively slight reliance upon the bolts which are used to hold the parts together. In this way the strain on the bolts is minimized and the bumper is strengthened as well as reenforced against the effects of vibration.

It is a further object of the invention to provide means for securing the several parts together by means of a single bolt and to so key or interlock the parts that such bolt will be relieved of all strains other than the tension strains for which it is particularly adapted.

In the drawings.

Like parts are identified by the same reference characters throughout the several views.

The bumper is of the double bar type and includes buffer bars 5 and 6. These bars are preferably identical in their shape and construction so that manufacturing costs will be kept lower than would be the case if bars of differing construction were used. For reasons which will hereinafter be made clear, the bars 5 and 6 are preferably spaced apart by a distance corresponding substantially exactly to their own vertical height.

Figure 1:
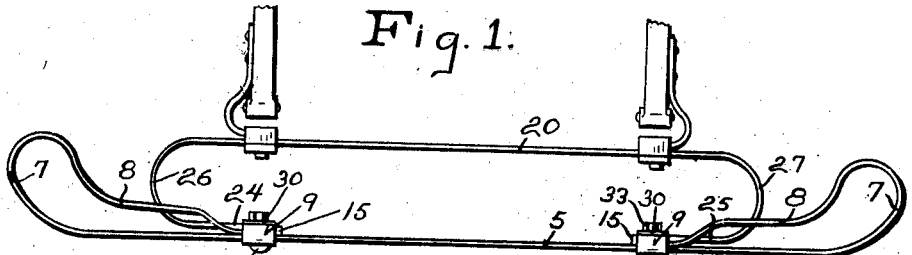
Figure 1 is a plan view of my improved bumper structure.
Figure 2:
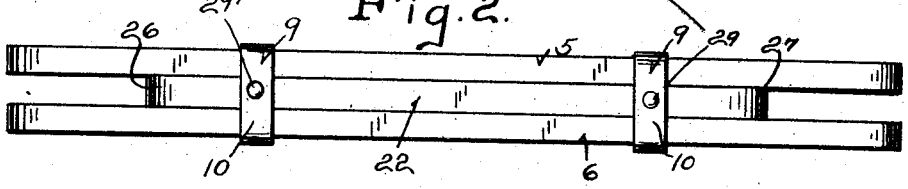
Figure 2 is a front elevation thereof.
Figure 3:
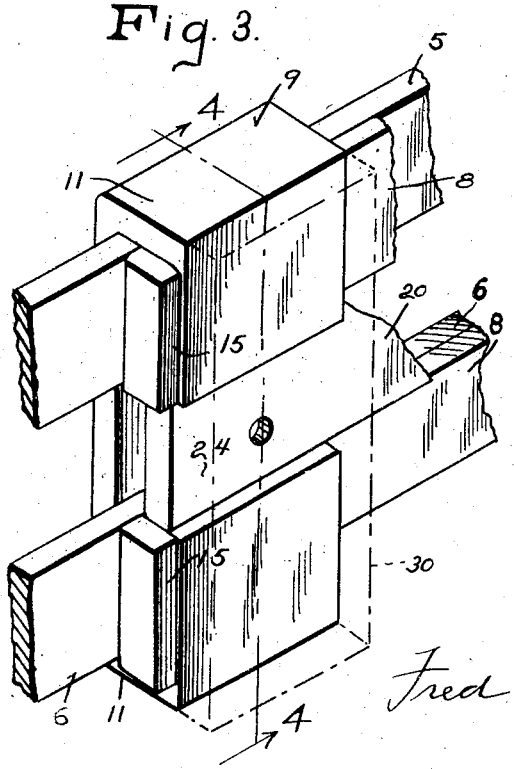
Figure 3 is a detail view on an enlarged scale in perspective of the improved clamp or fitting which holds the several parts of the bumper together.

Each of the bars 5 and 6 extends in a straight line throughout its intermediate portion and is bent back upon itself at each of its ends to provide the rounded loops 7. These loops are so formed as to be elongated at a rearward angle, as is best shown in Figure 1. The extreme end portions of each bar are led from the loop in substantial parallelism with the straight intermediate bar portion or spaced therefrom as at 8, and are thence tied inwardly by the clips or retaining devices 9 in actual contact with the intermediate bar portion. This construction is such as to give strength as well as resiliency to the loops. The fact that the end of each bar is held to an intermediate portion thereof amounts, in effect, to doubling the thickness of the end portions of the bar and thereby to double the strength of such portions. At the same time, the fact that the bar does not extend in a straight line from the extremity of the loop to the clip 9 makes it possible for forces exerted upon the bar to act with moment thereon, whereby the resilient yielding characteristic of the device is enhanced.

The clip or retaining device 9 which has been referred to above is preferably in the form of a C-shaped clamping member having a body portion of relatively flat front 10 and arms 11 which extend rearwardly and thence toward each other as at 12 in substantial parallelism with the front or body portion 10 of the clamp. The portions 12 of these arms are of substantially the same vertical extent as the bar or buffer members 5 and 6, and consequently are of themselves adapted to secure these bar or buffer members against twisting. They are spaced from the body portion 10 of the clamp just sufficiently to receive each buffer bar and its reversely bent portion 8. The reversely bent extremity of each such buffer bar preferably terminates in a rearwardly bent extremity or hook such as is shown at 15. When the parts are properly assembled the extremity or hook 15 of each buffer bar will abut the vertically extending portions 12 of arms 11, thereby to secure the clamp against bodily inward movement with respect to the buffer bars.

Figure 4:
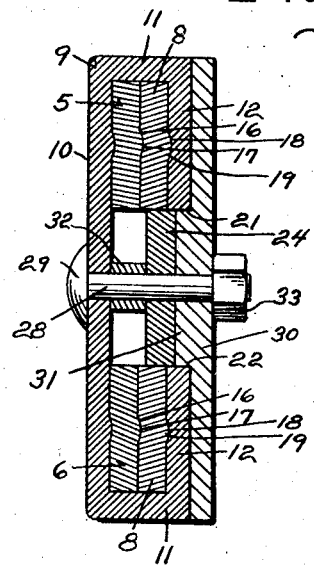
Figure 4 is a section taken on line 4—4 of Figure 3.

In order further to secure the parts against relative movement, I prefer to subject each of the bars 5 and 6 and their respective adjacent portions 8 to the action of a powerful press or the like which is capable of making a protuberance 16 in the face of each bar, and a corresponding recess 17 in the portion 8 of each bar extremity, such protuberance and recess being interlocked when the bar is properly clamped within the fitting 9. If desired, the portions 12 of arms 11 of the clamp may be provided with recesses 18 formed either by drilling or punching such arm portions and adapted to receive protuberances 19 formed on the rear faces of bar extremities 8 by the punching operation above described. If this is done the bar extremities will not only be interlocked with the central portion of the bars but in addition the entire bar will be interlocked with the arm of the clamp which lies adjacent thereto. The interlocking engagement of these parts is clearly illustrated in Figure 4.

The ends 21 and 22 of the arm portions 12 are preferably so spaced as to permit the bodily introduction of bars 5 and 6 in the clamp. In other words, the vertical distance between the end surfaces 21 and 22 of the clamp arms is at least as great as the vertical extent of the buffer bars. The clamp will preferably be made of sheet metal so as to have sufficient resilience to permit its arms to be sprung slightly for the introduction of the buffer bars and tied-in extremities 8 therebetween to a position for the operative interlock of these parts as above described.

Not only are the main buffer bars 5 and 6 preferably made of resilient material in the usual manner, but in addition to their inherent resiliency I provide for further resiliency in the bumper as a whole by the use of an additional resilient bar, which in itself comprises a bumper, but which is reversed in its position from the location usually occupied by a bumper member. This reversal of the member from the usual position of a single bar bumper is made possible by the fact that bars 5 and 6 provide all of the effective buffer surface which is necessary, and I am therefore able to reverse bar 20 for the purpose of retaining all of its resilient, flexible characteristics while increasing materially the strength of the bumper as a whole.

It will be noted that the bar 20 is of an elongated C-shaped in plan. The manner in which this bar is supported from the frame of a vehicle is immaterial to the present invention and any of the well known types of bumper brackets may be employed for this purpose. The bumper bracket, however, is usually weaker than the remainder of the bumper and is usually the first thing to suffer in the event of a collision or shock. I find that the brackets are materially reenforced by having the intermediate portion 21 of bar 20 extend across between whatever brackets are used. If it were not for this particular feature the bar 20 might be reversed to dispose its intermediate portion 21 within the retaining devices 9 in the place of its end portions 24 which are illustrated as being engaged in such devices.

The vertical dimension of bar 20 is preferably equal to the vertical heights of buffer bars 5 and 6 and to the vertical space between extremities 21 and 22 of arm portions 12. This being true, it will be clear that the ends 24 and 25 of bar 20 will just fit between the ends 8 of upper and lower buffer bar members 5 and 6 in the manner clearly shown in Figure 4. In this position the end portion 24 of supporting bar 20 will key the upper and lower buffer bar members apart and maintain such members in the opposite ends of clamp 9 where the arm portions 12 of the clamp are most effective to maintain the buffer bar members against torsional displacement from their proper positions. The keying effect above referred to is enhanced if the device is so made that the curved portions 26 and 27 of supporting bar 20 pass between the corresponding parts 8 of the upper and lower buffer bars 5 and 6 at some distance from the clamp in the manner best shown in Figure 1. It is particularly to be noted that so long as the ends 24 of the supporting bar maintain the positions above described the mere interlocking of the parts will keep the upper and lower buffer bars in their proper respective positions, no bolts, screws or the like being necessary for this purpose.

It is necessary, however, to provide one or more bolts for the purpose of ensuring that the supporting bar 24 will maintain its proper position as above indicated and also for the purpose of drawing in the extremities 21 and 22 of clamp arm portions 12 if such portions become sprung during the introduction of the buffer bar members with their respective protuberances 19. To this end a single bolt 28 is passed through an aperture made centrally in the plate portion 10 of clamp 9 until its head 29 contacts with the exterior surface of such plate. Each of the extremities 24 and 25 of the supporting bar 20 is likewise apertured to receive this bolt, and a clamping plate 30 is correspondingly apertured. The clamping plate 30 has a boss portion 31 which contacts with the rear surfaces of its respective end portion 24 or 25 of supporting bar 20. A thimble or short sleeve 32 upon bolt 28 acts as a stop for the adjacent end portion of the supporting bar and permits such end portion to be clamped between the thimble and boss portion 31 of the clamping plate 30 when a nut 33 is tightened on bolt 28. At the same time the plate 30 will have sufficient vertical extent to engage and act clampingly upon the portions 12 of the arms 11 of clamp fitting 9, and the slight spring above referred to in the arm portions 12 will ordinarily enable all of the parts to be held snugly together when the nut 33 is tightened.

It will be seen from the foregoing description of my invention that the specified objects are fully satisfied and that an unusually strong, resilient device has been produced. It will also be recognized by those skilled in the art that this device can be easily and cheaply manufactured, that its parts are inconspicuously held together in a manner productive of an attractive appearance, and that the securing bolt is so relieved of strain as to tend to minimize the possibility of disintegration under the vibration to which devices of this character are subjected.

I claim:

1. In a device of the character described, the combination with a pair of vertically spaced buffer bars, of a C-shaped supporting member having its ends extending toward each other and formed with recesses, said bars having protuberances in interlocked relation with said recesses.

2. In a device of the character described, the combination with a clamping fitting having a face plate and arms extending rearwardly therefrom and thence toward each other in substantial parallelism with said plate, of upper and lower buffer bar elements disposed within said fitting between said plate and opposing parallel portions of said arms, said elements being interlocked with said fitting.

3. In a device of the character described, the combination with a clamping fitting having a face plate and arms extending rearwardly therefrom and thence toward each other in substantial parallelism with said plate, of upper and lower buffer bar elements disposed within said fitting between said plate and opposing parallel portions of said arms, said fitting having recesses and said elements having protuberances in interlocked relation with said recesses.

4. In a device of the character described, the combination with a clamping fitting having a face plate and arms extending rearwardly therefrom and thence toward each other in substantial parallelism with said plate, of upper and lower buffer bar elements disposed within said fitting between said plate and opposing parallel portions of said arms, said fitting having recesses and said elements having protuberances in interlocked relation with said recesses, together with a plate adjustable into clamping engagement with said arms and adapted to maintain said elements and said fitting in interlocked relation.

5. In a device of the character described, the combination with a buffer bar having an extremity bent back upon itself and provided with a hook-shaped terminal portion, of a support, and a clamp connecting said support and bar and abutting said terminal portion.

6. In a device of the character described, the combination with a clamp having a face plate portion and arm portions spaced therefrom, of upper and lower buffer bar elements secured respectively between said arms and said face plate portion, a plate extending between said arms, and a supporting bar connected with said plate and disposed between said elements in a position to secure them against relative movement toward each other within said clamp.

7. In a device of the character described, the combination with a clamp having a face plate portion and arm portions spaced therefrom and substantially parallel therewith, of upper and lower buffer bar elements respectively secured in the spaces between said arm portions and said face plate, a clamping plate disposed exteriorly of said arms, a bolt connecting said clamp with said clamping plate, and a supporting bar operatively maintained by said bolt in connection with said clamp.

8. In a device of the character described, the combination with a clamp having a face plate portion and arm portions spaced therefrom and substantially parallel therewith, of upper and lower buffer bar elements respectively secured in the spaces between said arm portions and said face plate, a clamping plate disposed exteriorly of said arms, a bolt connecting said clamp with said clamping plate, and a supporting bar operatively maintained by said bolt in connection with said clamp, said supporting bar being spaced from said clamping plate at a point within said clamp where it is interposed between said elements, whereby to secure said elements in opposite ends of said clamp.

9. In a device of the character described, the combination with a buffer bar having an extremity bent back upon itself, said buffer bar and extremity being provided with recessed and apertured portions in interlocking engagement, of a clamp having a complementary portion interlocked with one of said first mentioned portions, and a support connected by said clamp to said bar.

10. In a device of the character described, the combination with a pair of buffer bars having their extremities bent back upon themselves, of clamps embracing said bars and extremities, said clamps, bars and extremities being provided with interlocking apertures and recessed portions, and a clamping plate adjustable with reference to said clamp to subject the clamp to pressure and adapted to maintain such portions interlocked.

FRED H. WILLIAMSON.